US010209984B2

(12) United States Patent
Novak et al.

(10) Patent No.: US 10,209,984 B2
(45) Date of Patent: Feb. 19, 2019

(54) IDENTIFYING A DEFECT DENSITY

(71) Applicant: HEWLETT PACKARD ENTERPRISE DEVELOPMENT LP, Houston, TX (US)

(72) Inventors: Miroslav Novak, Prague (CZ); Filip Blaha, Prague (CZ); Petr Dousa, Prague (CZ)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/491,229

(22) Filed: Apr. 19, 2017

(65) Prior Publication Data
US 2017/0220338 A1    Aug. 3, 2017

Related U.S. Application Data

(63) Continuation of application No. 13/597,689, filed on Aug. 29, 2012, now Pat. No. 9,658,939.

(51) Int. Cl.
| *G06Q 10/06* | (2012.01) |
| *G06F 11/36* | (2006.01) |
| *G06F 8/71* | (2018.01) |
| *G06F 11/00* | (2006.01) |
| *G06F 8/77* | (2018.01) |

(52) U.S. Cl.
CPC .............. *G06F 8/71* (2013.01); *G06F 8/77* (2013.01); *G06F 11/008* (2013.01); *G06F 11/362* (2013.01); *G06F 11/3668* (2013.01); *G06Q 10/06398* (2013.01)

(58) Field of Classification Search
None
See application file for complete search history.

(56) References Cited

U.S. PATENT DOCUMENTS

| 7,337,124 | B2 | 2/2008 | Corral | |
| 7,562,344 | B1 | 7/2009 | Allen et al. | |
| 2004/0205727 | A1* | 10/2004 | Sit ....................... | G06F 11/3664 717/125 |
| 2006/0123389 | A1* | 6/2006 | Kolawa .............. | G06F 11/3616 717/101 |
| 2006/0149575 | A1 | 7/2006 | Varadarajan et al. | |
| 2008/0066050 | A1 | 3/2008 | Jain et al. | |
| 2008/0301639 | A1 | 12/2008 | Bell et al. | |
| 2009/0070734 | A1 | 3/2009 | Dixon et al. | |

(Continued)

OTHER PUBLICATIONS

A. Schröter, T. Zimmermann, R. Premraj, and A. Zeller, "If your bug database could talk . . . " (2006), Proceedings of the 5th International Symposium on Empirical Software Engineering. vol. II: Short Papers and Posters, pp. 18-20 [retrieved from https://www.st.cs.uni-saarland.de/publications/files/schroeter-isese-2006b.pdf].*

(Continued)

*Primary Examiner* — Brian W Wathen

(57) ABSTRACT

A technique includes tracking changes to a code base using a source code management application; and maintaining a correlation between defects in the code base and changes addressing the defects. The technique includes determining a defect density in a subset of the code base associated with implementation of a requirement for the code base. Determining the defect density includes identifying how many defects are addressed by changes that modify the subset of the code base.

18 Claims, 5 Drawing Sheets

(56) References Cited

U.S. PATENT DOCUMENTS

| | | | |
|---|---|---|---|
| 2011/0055799 A1 | 3/2011 | Kaulgud et al. | |
| 2011/0252394 A1 | 10/2011 | Sharma et al. | |
| 2012/0036492 A1 | 2/2012 | Armstrong et al. | |
| 2012/0272220 A1* | 10/2012 | Calcagno | G06F 8/77 717/125 |
| 2013/0031423 A1* | 1/2013 | Barrow | G06F 11/3616 714/47.2 |
| 2013/0047140 A1* | 2/2013 | Shann | G06F 11/3664 717/128 |
| 2013/0152044 A1* | 6/2013 | Salecker | G06F 8/70 717/120 |
| 2013/0311972 A1* | 11/2013 | Supplisson | G06F 11/362 717/121 |

OTHER PUBLICATIONS

Wu et al., "ReLink: Recovering Links between Bugs and Changes" (Sep. 2011), Proceedings of the 19th ACM SIGSOFT symposium and the 13th European conference on Foundations of software engineering, pp. 15-25 [retrieved from https://dl.acm.org/citation.cfm?id=2025120].*

Fisher et al., "Analyzing and Relating Bug Report Data for Feature Tracking" (Jun. 2003), Distribtued Systems Group, Technical University of Vienna, pp. 1-10 [retrieved from http://turingmachine.org/~dmg/dchurch/mf-feature_tracking.pdf].*

Wikipedia, "Property (programming)" (Aug. 26, 2012), pp. 1-9 [retrieved from https://en.wikipedia.org/w/index.php?title=Property_(programming)&oldid=509210584].*

Microsoft, "Microsoft Computer Dictionary", 5th Edition (2002), p. 427.*

Harper, D., "Six Sigma Approach to Measuring Developer Productivity," (Web page), Jul. 30, 2007, 12 pages, available at http://blogs.construx.com/forums/p/186/262.aspx.

McKeehan et al., "Improving Product and Process: Implementing a Metrics Program in a Mid-Sized Software Development Company" (1998), Allied Academies International Conference. Academy of Information and Management Sciences. Proceedings, 2(1), pp. 1-11 [Retrieved from http://search.proquest.com/docview/192409099?accountid=14753].

Nagappan, N. et al., "Use of Relative Code Churn Measures to Predict System Defect Density," (Research Paper), Proceedings 27th International Conference on Software Engineering, 2005, IEEE, 9 pages, available at https://www.microsoft.com/en-us/research/wp-content/uploads/2016/02/icse05churn.pdf.

Sherriff, M. et al., "Defect Density Estimation Through Verification and Validation," (Research Paper), The 6th Annual High Confidence Software and Systems Conference, 2006, 7 pages, available at http://www.cs.virginia.edu/~sherriff/papers/Sherriff_HCSS.pdf.

Synopsys, Inc., "Coverity SAVE," (Web Page), Static Analysis Testing Engine, 2017, 4 pages, available at http://www.coverity.com/products/coverity-save/.

Weller III, E. F., "Re: [CMMi Process Improvement] Defect Density," (Web Page), Jun. 12, 2011, 4 pages, available at http://tech.dir.groups.yahoo.com/group/cmmi_process_improvement/message/18514.

* cited by examiner

IDENTIFYING A DEFECT DENSITY

CROSS REFERENCE TO RELATED APPLICATIONS

This is a continuation of U.S. application Ser. No. 13/597,689, which was filed on Aug. 29, 2012, and is hereby incorporated by reference in its entirety.

BACKGROUND

Development of software can be challenging. During the development of software, computer program code can be written by one or more developers. Often, complex software includes code written by teams of developers. Accordingly, different portions of the code can be written by different developers. In addition, the code can be written at different times, during different phases of the software development cycle. For example, original code may be reviewed and tested to identify defects in the code. Defects may be addressed by modifying the original code. New defects can sometimes be added to the software by the modifications.

BRIEF DESCRIPTION OF THE DRAWINGS

The following detailed description refers to the drawings, wherein.

DETAILED DESCRIPTION

According to an embodiment, a computing system can include a code tracker to track changes to a code base. The code base may be a collection of source code used to build a particular software program. The system may also include a defect tracker to track any defects addressed by the changes. A defect may be an error, flaw, mistake, failure, or fault in a computer program that produces an incorrect or unexpected result or that causes the program to behave in unintended ways. A defect may also be an indication that some aspect of the software does not meet a requirement for the software. A requirement may represent a feature, property, functionality, or the like, that the software is supposed to have.

The system may also include a defect density module. The defect density module may determine a number of defects in a portion of the code base having a characteristic. The characteristic may be at least one of an author and a requirement. For example, if the characteristic is an author, then the portion of the code base having the characteristic would be code that was authored by the author. If the characteristic is a requirement, then the portion of the code base having the characteristic would be code implementing the requirement. The defect density module may determine the number of defects in the portion of the code base having the characteristic by determining which changes addressing a defect occurred in the portion of the code base having the characteristic. Another characteristic that may be considered is a time period during which the code was produced. Characteristics may be combined as well, such that the portion of the code base may have all of the combined characteristics. For instance, the portion of the code base may include code authored by a particular author during a particular time period. Determining defect density in this manner may be advantageous for identifying trends and patterns and for improving code quality over time.

Further details of this embodiment and associated advantages, as well as of other embodiments, will be discussed in more detail below with reference to the drawings.

Figure 1:
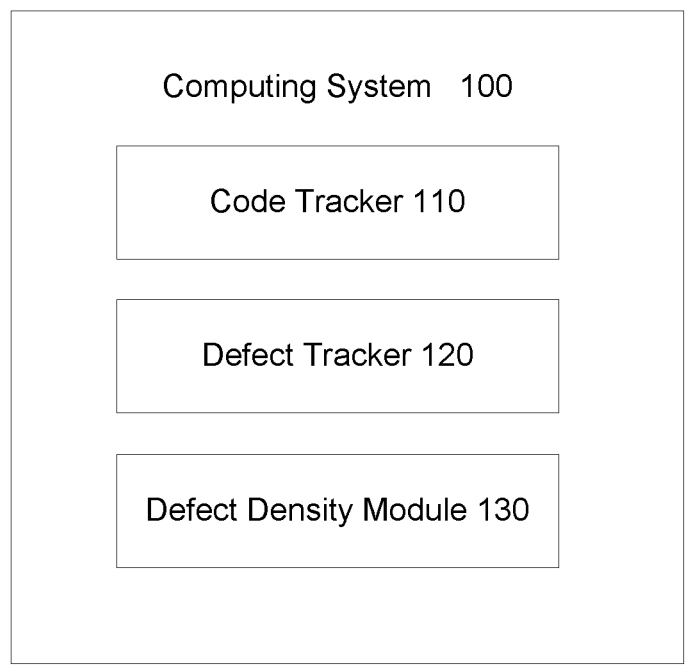
FIG. 1 illustrates a computing system for determining a defect density, according to an example.

Referring now to the drawings, FIG. 1 illustrates a computing system for determining a defect density, according to an example. Computing system 100 may include and/or be implemented by one or more computers. For example, the computers may be server computers, workstation computers, desktop computers, or the like. The computers may include one or more controllers and one or more machine-readable storage media.

A controller may include a processor and a memory for implementing machine readable instructions. The code tracker 110, defect tracker 120, and defect density module 130 include software modules, one or more machine-readable media for storing the software modules, and one or more processors for executing the software modules. A software module may be a computer program comprising machine-executable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

Controller 130 may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, computing system 100 may include one or more machine-readable storage media separate from the one or more controllers.

Computing system 100 may include code tracker 110, defect tracker 120, and defect density module 130. Each of these components may be implemented by a single computer or multiple computers. In addition, users of computing system 100 may interact with computing system 100 through one or more other computers, which may or may not be considered part of computing system 100. As an example, a software developer may interact with code tracker 110 via a computer application residing on another computer, such as a desktop computer, workstation computer, tablet computer, or the like.

Code tracker 110, defect tracker 120, and defect density module 130 may be considered to be functionality implemented by one or more components of a software development platform executed by computing system 100. The software development platform may be a single or multiple software applications that facilitate the development and management of software. For example, the platform may include a source code management program to manage the code base, track changes, and track the authors of the changes. The source code management program may maintain a copy of the code base and may accept changes to the code base from developers. The source code management program may thus maintain a history of the code base and may also manage conflicts, ensuring that the same portion of the code base is not simultaneously modified by different developers. The platform may also include a project management program, which can track requirements, facilitate testing, track defects, and provide analysis capabilities. The project management program can interface with the source code management program to link requirements and defects with portions of the code base, past changes, etc. The platform may also include an integrated development environment (IDE), which can provide a software development interface for software developers. The IDE can provide a user-friendly interface to developers for coding, checking code into the source code management program, indicating relevant information regarding requirements or defects that the code relates to, and the like. In some embodiments, the functionality of the code tracker 110, defect tracker 120, and defect density module 130 may be implemented by combinations of these components. Furthermore, in some examples, the software development platform can take a different form, with the various functionality being implemented by a single application or component or by different applications or component than described here.

Code tracker 110 may track changes to a code base. The code tracker 110 may maintain a copy of the code base. The code base may be the collection of source code used to build a particular software program being developed. Code tracker 110 may also manage changes (or modifications) to the code base. For example, code tracker 110 may accept a set of changes (sometimes referred to as a "change set") from a first developer and another change set from a second developer to different portions of the code base and may maintain a history of the changes, such that prior versions of the code base may be reconstructed and such that changes to the code base can be traced. A change set may also include a new addition to the code base, such as a new class or software module. The code tracker 110 may also ensure that two developers do not modify the same portion of code at the same time.

Code tracker 110 may also record information regarding each change set. For example, code tracker 110 may record the author of the change set and the date that the change set was checked in to the code tracker. Code tracker 110 may record other information related to the purpose of the change set. For example, code tracker 110 may record which requirement the change set is meant to implement or which defect the change set is meant to address. In an example, the requirement or the defect may be entered by the developer.

During testing of the code base, a number of defects may be discovered. A defect may be an error, flaw, mistake, failure, or fault in the computer program that produces an incorrect or unexpected result or that causes the program to behave in unintended ways. Defects may be discovered automatically by automated tests run on the code base. For example, a set of unit tests may be designed to test the internal structure and workings of the software. This type of testing may be referred to as static testing. Dynamic testing may also be used to discover defects in the software. For example, simulated users, called testers, may test the functionality of the software and determine whether it meets the requirements for the software. As discussed previously, a requirement may represent a feature, property, functionality, or the like, that the software is supposed to have. Specifying requirements usually occurs in an early phase of software development, before coding begins. In one example, discovered defects may be managed by the project management application of the software development platform.

Defect tracker 120 may track any defects addressed by change sets tracked by code tracker 110. For example, a developer that commits a change set may indicate that the change set addresses one or more defects being tracked by defect tracker 120. Defect tracker 120 may interface with code tracker 110 to maintain a correlation between the change set and the defects addressed by the change set.

The defect density module 130 may determine a number of defects in a portion of the code base having a particular characteristic. The characteristic may be at least one of an author and a requirement. For example, if the characteristic is an author, then the portion of the code base having the characteristic would be code that was authored by the author. The author may be any of various developers that have authored code in the code base. If the characteristic is a requirement, then the portion of the code base having the characteristic would be code implementing the requirement. Another characteristic that may be considered is a time period during which the code was produced. For example, code generated during the month of March may be considered. Characteristics may be combined as well, such that the portion of the code base may have all of the combined characteristics. For instance, the portion of the code base may include code authored by a particular author during a particular time period. In another example, the portion of the code base may include code authored by a particular author that implements a particular requirement.

The defect density module 130 may identify the portion of the code base having the characteristic by requesting from the code tracker 110 code in the code base having the characteristic. The code tracker 110 may provide code having the characteristic whether the code constitutes original code or changes to original code. That is, the portion of the code base having the characteristic may be code authored at any point during the development cycle as long as the code has the specified characteristic. Additionally, the portion of the code base may include non-consecutive lines of code. For example, if the characteristic is a particular author, code authored by the author in a change set that constitutes a modification of existing code may include changes to non-consecutive lines of existing code.

The defect density module 130 may determine the number of defects in the portion of the code base having the characteristic by determining which changes addressing a defect occurred in the portion of the code base having the characteristic. The defect density module 130 may determine this by referring to the defect tracker 120, which maintains a correlation between all committed changes sets that address a defect and the defects addressed by those change sets. An example illustration will be provided with respect to FIG. 3, discussed later.

The number of defects in a portion of the code base may be considered a defect density. Sometimes the defect density may be referred to as a number of defects per number of lines of code. Accordingly, the number of lines of code in the portion of the code base having the characteristic may be determined, so that the defect density may be indicated in such a manner. This will also be discussed in more detail with respect to FIG. 3.

Figure 2:
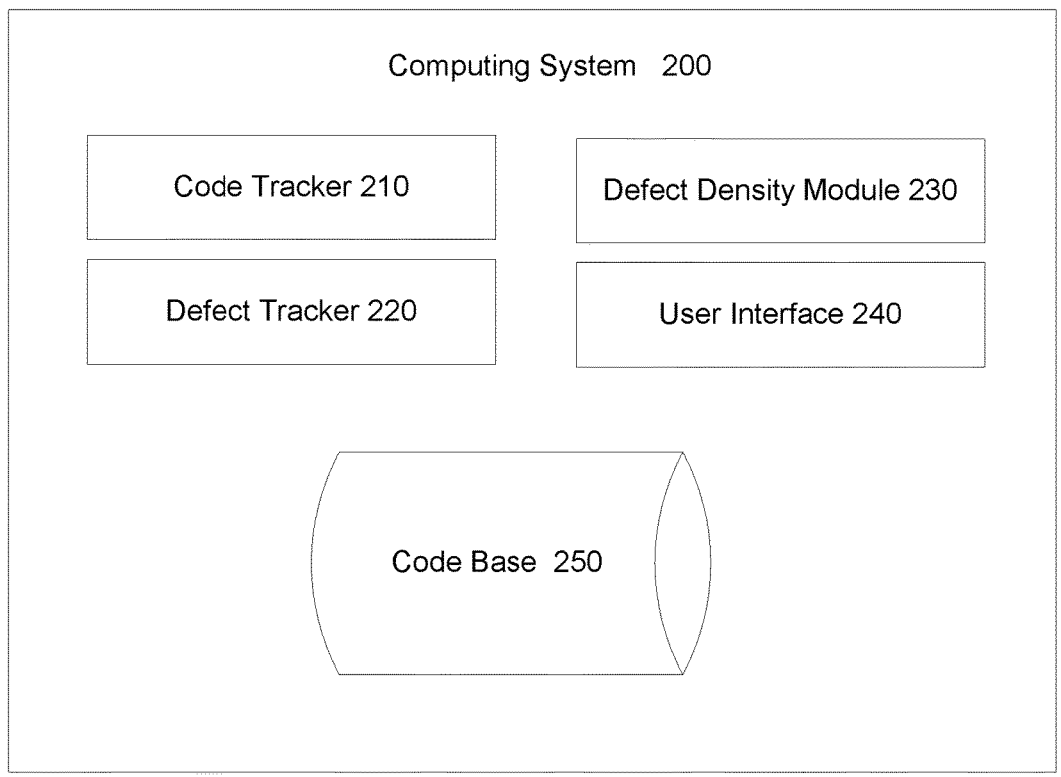
FIG. 2 illustrates a computing system for determining a defect density, according to an example.

FIG. 2 illustrates a computing system 200 for determining a defect density, according to an example. Computing system 200 may be similar to computing system 100, as described above. Code tracker 210, defect tracker 220, and defect density module 230 may also be similar to the identically named elements in computing system 100. Computing system 200 may also include a user interface 240 and a code base 250. Code base 250 may be a database for storing the code base. Code base 250 may include one or more data storage devices and may be spread across one or more computers, such as server computers. Code base 250 may be managed by the source code management program.

User interface 240 may include hardware components and software components. The hardware components may include input devices (e.g., keyboard, mouse, touch screen, microphone, etc.) and output devices (e.g., a display, a touch display, speakers, etc.). The hardware components may be part of a user's device used to interact with computing system 200. The software components may include one or more graphical user interfaces implemented by the user's device that interface with the user for receiving input and providing output. In some examples, user interface 240 can be considered to include only the software component.

The user interface 240 may interface with other components of computing system 200. Accordingly, for example, user interface 240 may be used to interact with the software development platform and may be a part of the platform. For example, user interface 240 may be an interface for the source code management program, the project management application, or the IDE.

User interface 240 may be used to specify the characteristic(s) for identifying the portion of the code base. For example, the user interface 240 can be used to identify an author, a requirement, or a time period. User interface 240 may also be used to commit change sets to the code base. In particular, user interface 240 may be used to specify one or more defects addressed by a change set or one or more requirements implemented by a change set.

Figure 3:
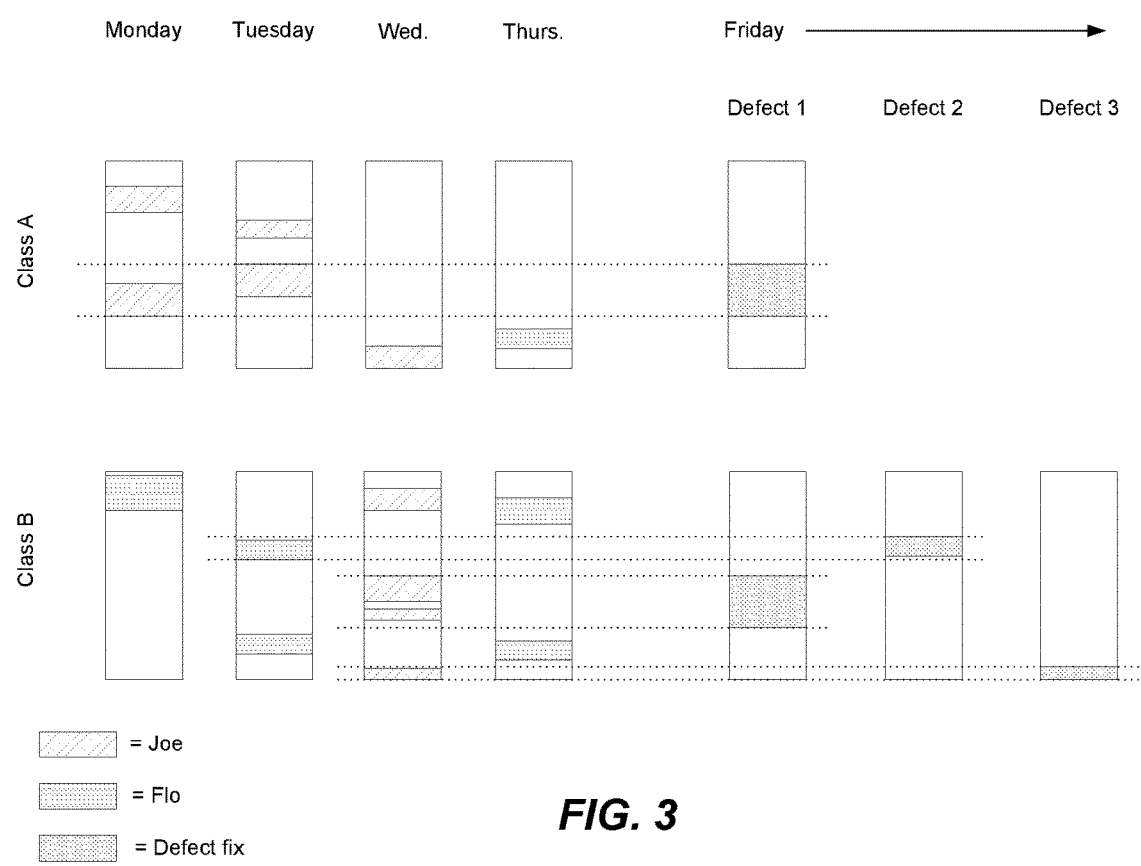
FIG. 3 illustrates a use case in which a defect density can be determined based on multiple characteristics, according to an example.

FIG. 3 illustrates a use case in which a defect density can be determined based on multiple characteristics, according to a simplified example. Code development is indicated over the course of a work week. Change sets modifying two classes, Class A and Class B, are shown. Specifically, the large rectangle represents the class as a whole and the shaded rectangles on Monday-Thursday indicate changes to the classes by two different developers, Joe and Flo. Each developer's changes to the classes for a single day may represent changes in a single change set. Alternatively, the changes may have been committed to the code base in separate instances, even on the same day. An example of changes spanning non-consecutive lines of code is shown in Class A on Monday. As can be seen, Joe's committed changes for the day modify different portions of the class.

The shaded rectangles shown in Class A and Class B on Friday indicate modifications to the two classes to correct defects. Note that these modifications themselves represent change sets and that it is possible that new defects could be discovered due to these changes. As can be seen, there are three defects that are corrected on Friday. Defect 1 required modifications to Class A and Class B. Defects 2 and 3 only required modifications to Class B.

As shown by the dotted lines, the code modified to address the defects can be traced back to previous change sets where the code was originally entered or modified. For example, the changes to Classes A and B to address Defect 1 modified code authored by Joe. The changes to Class B to address Defect 2 modified code authored by Flo. The changes to Class B to address Defect 3 modified code authored by Joe. Accordingly, two defects can be attributed to Joe and one defect can be attributed to Flo. Additionally, assuming that Joe and Flo each authored 1000 lines of code, a defect density for Joe's code can be said to be 2 defects per 1000 lines of code. A defect density for Flo's code can be said to be 1 defect per 1000 lines of code. This information may be presented in graph form and may be useful to identify developers that have a higher rate of defects.

The defect density may also be measured according to other characteristics or combinations of characteristics, as well. For example, a time period may be specified, one or more requirements may be specified, one or more modules of code may be specified, and the like. In this way, trends or patterns in defects may be identified. For example, by specifying both a developer and one or more requirements, it may be determined whether a developer tends to enter more defects depending on the requirement being implemented. This may occur due to the developer having a particular proficiency with one type of programming, such as user interface programming, while having a deficiency with another type of programming, such as database programming. In another example, it may be determined that a developer tends to generate more defects when modifying already existing code versus generating new code.

Figure 4:
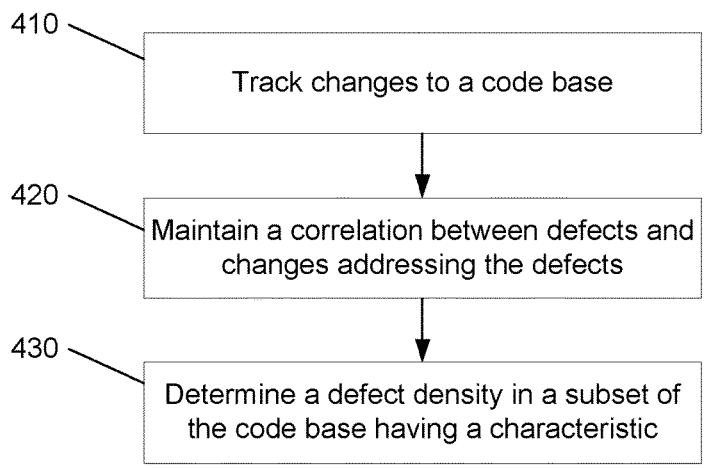
FIG. 4 illustrates a method of determining a defect density, according to an example.

FIG. 4 illustrates a method of determining a defect density, according to an example. Method 400 may be implemented by a computing system, such as computing system 100 or 200. At 410, changes to a code base may be tracked. For example, a software development platform may be used to track the changes. At 420, a correlation between defects and changes addressing the defects may be maintained. At 430, a first defect density in a first subset or portion of a code base having a characteristic may be determined. The characteristic may be an author or a requirement. The defect density may be determined by identifying changes addressing defects that modify the subset or portion of the code base.

Figure 5:
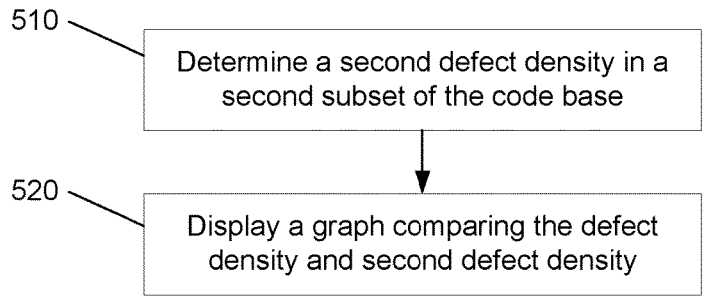
FIG. 5 illustrates a method of determining a second defect density and displaying the results, according to an example.

FIG. 5 illustrates a method of determining a second defect density and displaying the results, according to an example. Method 500 may be implemented by a computing system, such as computing system 100 or 200. At 510, a second defect density in a second subset or portion of the code base may be determined. For example, the second subset of portion of the code base may have a characteristic different from the characteristic of the first subset or portion of the code base. In one example, the characteristic of the first subset of the code base may be a first author and the characteristic of the second subset of the code base may be a second author. The second defect density may be determined by identifying changes addressing defects that modify the second subset of the code base. At 520, a graph may be displayed comparing the first defect density and the second defect density.

Figure 6:
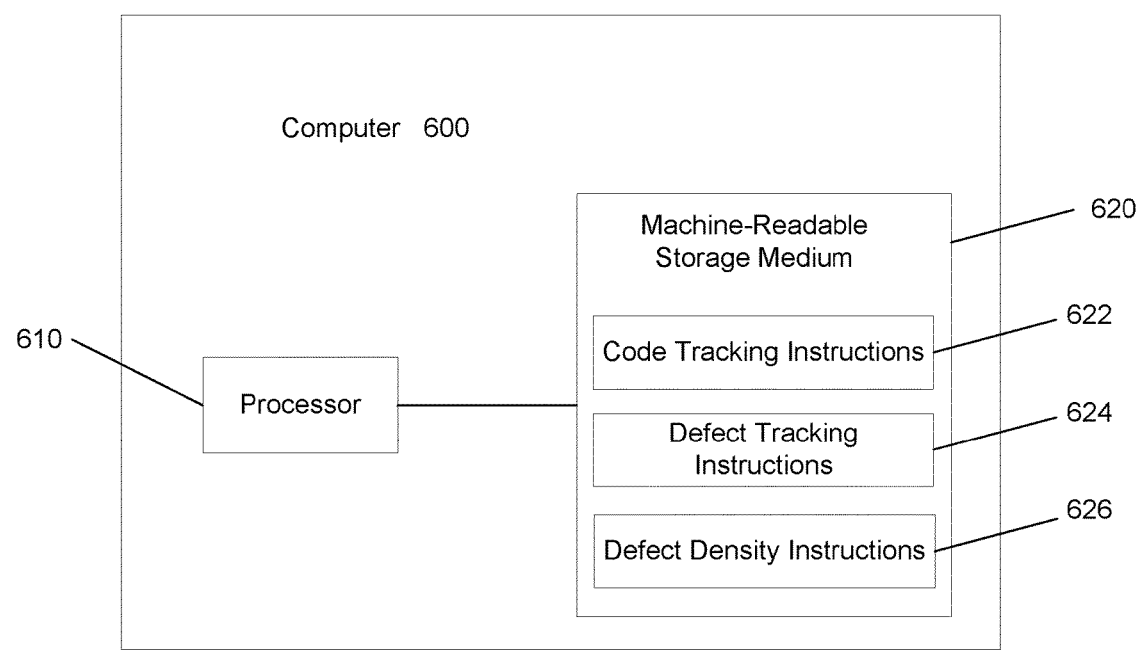
FIG. 6 illustrates a computer-readable medium for determining a defect density, according to an example.

FIG. 6 illustrates a computer-readable medium for determining a defect density, according to an example. Computer

600 may be any of a variety of computing devices or systems, such as described with respect to computing system 100 or 200.

Processor 610 may be at least one central processing unit (CPU), at least one semiconductor-based microprocessor, other hardware devices or processing elements suitable to retrieve and execute instructions stored in machine-readable storage medium 620, or combinations thereof. Processor 610 can include single or multiple cores on a chip, multiple cores across multiple chips, multiple cores across multiple devices, or combinations thereof. Processor 610 may fetch, decode, and execute instructions 622, 624, 626, among others, to implement various processing. As an alternative or in addition to retrieving and executing instructions, processor 610 may include at least one integrated circuit (IC), other control logic, other electronic circuits, or combinations thereof that include a number of electronic components for performing the functionality of instructions 622, 624, 626. Accordingly, processor 610 may be implemented across multiple processing units and instructions 622, 624, 626 may be implemented by different processing units in different areas of computer 600.

Machine-readable storage medium 620 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 620 can be computer-readable and non-transitory. Machine-readable storage medium 620 may be encoded with a series of executable instructions for managing processing elements.

The instructions 622, 624, 626, when executed by processor 610 (e.g., via one processing element or multiple processing elements of the processor) can cause processor 610 to perform processes, for example, the processes depicted in FIGS. 4 and 5. Furthermore, computer 600 may be similar to computing systems 100 or 200 and may have similar functionality and be used in similar ways, as described above.

Code tracking instructions 622 can cause processor 610 to track additions and changes to source code having multiple authors. Each addition and change may indicate the respective author. In one example, a software development platform may be used to track this information. Defect tracking instructions 624 can cause processor 610 to track defects addressed by the changes. Defect density instructions 626 can cause processor 610 to determine a defect density in a portion of the source code authored by a first author by identifying changes that modify the portion of the source code authored by the first author and that address a defect.

While the present disclosure has been described with respect to a limited number of embodiments, those skilled in the art, having the benefit of this disclosure, will appreciate numerous modifications and variations therefrom. It is intended that the appended claims cover all such modifications and variations.

What is claimed is:

1. A non-transitory computer-readable storage medium storing instructions that, when executed by a processor, cause the processor to:

track changes to a code base;

track defects in the code base and maintain a correlation between the changes and the defects addressed by the changes;

determine how many defects are addressed by changes occurring in a portion of the code base associated with implementation of a property for the code base; and determine a number of defects in the portion of the code base based on the determination of how many defects are addressed by the changes occurring in the portion of the code base.

2. The non-transitory computer-readable storage medium of claim 1, wherein the storage medium stores instructions that, when executed by the processor, causes the processor to provide a user interface to specify the property.

3. The non-transitory computer-readable storage medium of claim 2, wherein the storage medium stores instructions that, when executed by the processor, cause the user interface to specify a time period, wherein the portion of the code base associated with implementation of the requirement being limited to code authored during the time period.

4. The non-transitory computer-readable storage medium of claim 2, wherein the storage medium stores instructions that, when executed by the processor, cause the processor to identify the portion of the code base by requesting code in the code base associated with the implementation of the property.

5. The non-transitory computer-readable storage medium of claim 4, wherein the storage medium stores instructions to cause the processor to identify the portion of the code whether the portion of the code comprises original code added to the code base or changes to the original code.

6. The non-transitory computer-readable storage medium of claim 1, wherein the portion of the code base comprises non-consecutive lines of code.

7. A method comprising:

tracking changes to a code base using a source code management application;

maintaining a correlation between defects in the code base and changes addressing the defects;

identifying a subset of the code base associated with implementation of a property for the code base; and determining a defect density in the subset of the code base, wherein determining the defect density comprises identifying how many defects are addressed by changes that modify the subset of the code base.

8. The method of claim 7, further comprising identifying the subset of the code base associated with the implementation of the at least one property, feature or functionality for the code base.

9. The method of claim 7, further comprising:

determining a second defect density in a second subset of the code base, wherein determining the second defect density comprises identifying how many defects are addressed by changes that modify the second subset of the code base; and displaying a graph comparing the defect densities.

10. The method of claim 7, further comprising receiving specification of the at least one property, feature or functionality for the code base via a user interface.

11. The method of claim 7, further comprising providing a user interface to specify the at least one property, feature or functionality for the code base.

12. The method of claim 11, wherein providing the user interface comprises requesting code in the code base associated with the at least one property, feature or functionality for the code base.

13. A non-transitory computer-readable storage medium storing instructions that, when executed by a processor, cause the processor to:
- track changes to source code;
- track defects addressed by the changes;
- determine a correlation between the changes and the defects addressed by the changes;
- identify a portion of the source code based on a property for the source code;
- determine how many defects are addressed by changes occurring in the identified portion of the source code; and
- determine a defect density in the identified portion of the source code based on the determination of how many defects are addressed by the changes occurring in the identified portion of the source code.

14. The non-transitory computer-readable storage medium of claim 13, wherein the storage medium stores instructions that, when executed by the processor, cause the processor to identify the portion based on an author associated with the portion.

15. The non-transitory computer-readable storage medium of claim 13, wherein the storage medium stores instructions that, when executed by the processor, cause the processor to limit the identified portion of the source code based on a predetermined time interval.

16. The non-transitory computer-readable storage medium of claim 13, wherein the portion of the code base comprises non-consecutive lines of code.

17. The non-transitory computer-readable storage medium of claim 15, wherein the storage medium stores instructions that, when executed by the processor, cause the processor to provide a user interface to specify the predetermined time interval.

18. The non-transitory computer-readable storage medium of claim 15, wherein the storage medium stores instructions that, when executed by the processor, cause the processor to receive user input to specify the predetermined time interval and an author, and the portion of the source code associated with the predetermined time interval is also associated with the author.

* * * * *